United States Patent
Jazebi et al.

(10) Patent No.: US 10,784,673 B2
(45) Date of Patent: Sep. 22, 2020

(54) CURRENT PROTECTION DEVICE WITH MUTUAL REACTOR

(71) Applicant: Varian Semiconductor Equipment Associates, Inc., Gloucester, MA (US)

(72) Inventors: Saeed Jazebi, Peabody, MA (US); Paul J. Murphy, Reading, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 396 days.

(21) Appl. No.: 15/726,493

(22) Filed: Oct. 6, 2017

(65) Prior Publication Data

US 2019/0058318 A1     Feb. 21, 2019

Related U.S. Application Data

(60) Provisional application No. 62/547,382, filed on Aug. 18, 2017.

(51) Int. Cl.
    *H02H 3/08*     (2006.01)
    *H01H 33/666*   (2006.01)
    (Continued)

(52) U.S. Cl.
    CPC ............. *H02H 3/08* (2013.01); *H01H 33/32* (2013.01); *H01H 33/666* (2013.01);
    (Continued)

(58) Field of Classification Search
    CPC ......... H02H 3/08; H01H 33/32; H01H 33/666
    See application file for complete search history.

(56) References Cited

U.S. PATENT DOCUMENTS

| 9,183,996 B2* | 11/2015 | Karlstrom | ................. H01H 3/60 |
| 2001/0030594 A1* | 10/2001 | Abe | ....................... H01F 17/062 336/213 |

(Continued)

FOREIGN PATENT DOCUMENTS

| JP | 2002044859 A | 2/2002 |
| JP | 2002354713 A | 12/2002 |
| WO | WO2015062644 A | 5/2015 |

OTHER PUBLICATIONS

International Search Report and Written Opinion dated Dec. 14, 2018 for PCT/US2018/046864 filed Aug. 17, 2018.

*Primary Examiner* — Scott Bauer (57) ABSTRACT

Embodiments of the disclosure provide a current protection device with a mutual reactor including a first winding and a second winding. The current protection device is a subcomponent of a previously developed fault current limiter. The current protection device protects the superconductor from potential damage. The current protection device may include a coil electrically connected in series with the first winding or the second winding, an actuator mechanically coupled at an output of the coil, and an electrical interrupter electrically connected to the first and second windings, wherein the actuator is communicatively coupled with the electrical interrupter to actuate a moveable contact of a set of breaker contacts of the electrical interrupter. In some embodiments, the first and second windings are arranged in parallel to one another. In some embodiments, the coil is electrically coupled to an output of the first winding or the second winding.

20 Claims, 4 Drawing Sheets

(51) Int. Cl.
    *H02H 9/02*       (2006.01)
    *H02H 7/00*       (2006.01)
    *H01H 33/32*     (2006.01)
    *H01H 71/12*     (2006.01)
    *H01H 33/00*     (2006.01)

(52) U.S. Cl.
    CPC ............ *H02H 7/001* (2013.01); *H02H 7/008* (2013.01); *H02H 9/02* (2013.01); *H01H 33/004* (2013.01); *H01H 71/125* (2013.01); *H02H 9/023* (2013.01)

(56) References Cited

U.S. PATENT DOCUMENTS

| | | | |
|---|---|---|---|
| 2005/0128662 A1* | 6/2005 | Rostron | H01H 33/166 361/43 |
| 2012/0264613 A1* | 10/2012 | Tekletsadik | H02H 9/021 505/150 |
| 2013/0088802 A1* | 4/2013 | Berggren | H02H 3/42 361/65 |
| 2013/0194703 A1 | 8/2013 | Husband et al. | |
| 2015/0162742 A1 | 6/2015 | Tekletsadik | |

\* cited by examiner

CURRENT PROTECTION DEVICE WITH MUTUAL REACTOR

CROSS-REFERENCE TO RELATED APPLICATION

This application claims priority to U.S. Provisional Patent Application No. 62/547,382 filed Aug. 18, 2017, entitled "Current Protection Device with Mutual Reactor," and incorporated by reference herein in its entirety.

FIELD

This disclosure relates to current protection devices, and more particularly to a current protection device with mutual reactor suitable for use with a fault current limiter.

BACKGROUND

A fault current limiter (FCL) is a device for limiting fault currents, such as in a power system. Various types of FCLs have been developed over the last several decades, including superconducting fault current limiters (SCFCLs), solid state fault current limiters, inductive fault current limiters, as well as other varieties known in the art. FCLs may be implemented in a system having generation, transmission, and distribution networks for providing power to various industrial, commercial, and/or residential electrical loads.

A fault current is an abnormal current in an electrical system resulting from a fault in the system, such as a short circuit. A fault current may arise in a system due to any number of events or failures, such as power lines or other system components being damaged by severe weather (e.g. lightning strikes). When such a fault occurs, a large current (a fault current) can quickly appear in the circuit as the current is no-longer limited by load. This surge of current is undesirable because of potential damage to the load, including the network, or equipment connected to the network. As a result, fault current limiters are used to protect the network from severe damages. The current protection device (CPD) is a subcomponent of a fault current limiter. This device protects valuable components of a fault current limiter, e.g. superconductors, from potential damages.

In general, design of the CPD is sensitive to the normal (steady state) current and the prospective fault current levels. This is so because the actuation mechanism is set to a specific force. The electromagnetic force to actuate the mechanism is provided by the coil. The electromagnetic force of the coil is a direct function of square root of current. Since FCLs are usually installed in a unique substation, the steady state voltage and current, as well as the prospective fault current levels, are different depending on the installed unit. This makes the manufacturing and design process more labor intensive and complicated.

SUMMARY

In view of the foregoing, provided herein is a fault current limiter including a mutual reactor including a first winding and a second winding, and a current protection device electrically coupled with the mutual reactor. The current protection device may include a coil electrically connected in series with the first winding or the second winding, and an actuator electrically coupled at an output of the mutual reactor. The CPD may further include an electrical interrupter connected to the first and second windings, wherein the actuator is communicatively coupled with the electrical interrupter to actuate a moveable contact of a set of breaker contacts of the electrical interrupter.

In other embodiments, a current protection device includes a coil electrically connected in series with a first winding or a second winding of a mutual reactor, an actuator receiving an output of the mutual reactor, and an electrical interrupter connected with the first and second windings. The actuator is communicatively coupled with the electrical interrupter to actuate a moveable contact of a set of breaker contacts of the electrical interrupter.

In other embodiments, a method for limiting a fault current, includes providing a mutual reactor including a first winding and a second winding, and providing a current protection device electrically coupled with the mutual reactor. The current protection device may include a coil electrically connected in series with the second winding, an actuator receiving an output of the mutual reactor, and an electrical interrupter connected with the mutual reactor. The actuator is communicatively coupled with the electrical interrupter to actuate a moveable contact of a set of breaker contacts of the electrical interrupter.

BRIEF DESCRIPTION OF THE DRAWINGS

The accompanying drawings illustrate exemplary approaches of the disclosure, including the practical application of the principles thereof, as follows.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

As used herein, an element or operation recited in the singular and proceeded with the word "a" or "an" are understood as possibly including plural elements or operations, except as otherwise indicated. Furthermore, references to "one embodiment" or "some embodiments" of the present disclosure may be interpreted as including the existence of additional embodiments also incorporating the recited features.

Embodiments herein are provided in response to one or more of the deficiencies of the prior art identified above. As stated, FCLs are often installed in a unique substation, for example, in 50 or 60 Hz power systems. Because the CPD coil is prone to eddy current losses, enormous amounts of heat may be created. The heat may be controlled within certain limits according to thermal class of the insulation used for the wire and between the layers of the coil. The eddy current losses are higher for a 60 Hz system compared to a 50 Hz one. Furthermore, the spiral geometry of the coil also limits the heat dissipation, introducing more complexity to the coil design.

In some embodiments of the present disclosure, Litz wire may be used to limit the eddy current losses. Litz wires usually have limited thermal capacity due to the coating on the individual thin wires. For example, coil wires of the present disclosure may have a thermal class F (155° C.), a thermal class H (180° C.), and/or a thermal class M (220° C.).

Until now, the manufacturing process of higher temperature class wires is not well-known and more complicated. Also, the 220° C. wire is 3× more expensive than the 155° C. class wire. One will appreciate there is a limit (i.e., 220° C.) on the Litz wires. Therefore, for applications with high steady state current, prior art applications have failed to apply adequate force to actuate the plunger of an electrical interrupter, while keeping within acceptable thermal performance.

To address the above mentioned issues of the prior art, embodiments herein can control the current flowing through coil independent of the power system the CPD is being installed in (independent of steady state current and prospective fault current level). This could be achieved with a mutual reactor (i.e., a two winding transformer). More specifically, embodiments of the disclosure provide a fault current limiter including a mutual reactor including a first winding and a second winding, and a current protection device electrically coupled with the mutual reactor. The current protection device may include a coil electrically connected in series with the first winding or the second winding, an actuator receiving an output of the mutual reactor. An electrical interrupter may be connected to the first and second windings, wherein the actuator is communicatively coupled with the electrical interrupter to actuate a moveable contact of a set of breaker contacts of the electrical interrupter. In some embodiments, the first and second windings are arranged in parallel with one another. In some embodiments, the coil is directly electrically coupled to an output of the first and second windings.

Figure 1:
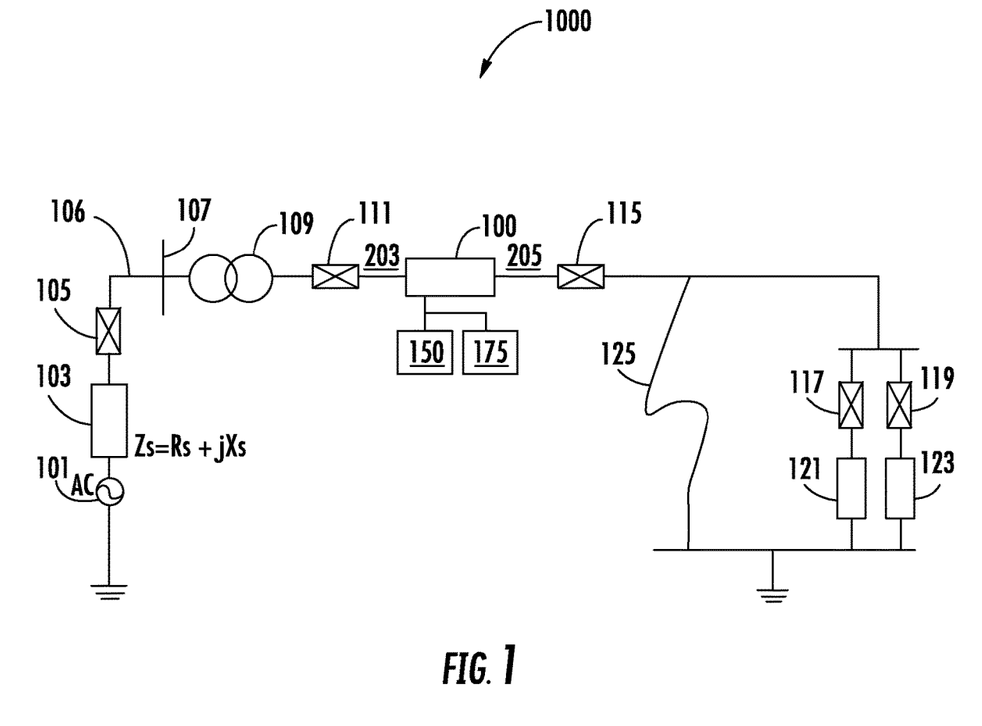
FIG. 1 depicts a power transmission and distribution system in accordance with embodiments of the disclosure.

As will be described further herein, during steady state operation, the first conductive winding and the second conductive winding (e.g., counter wound windings) of the current protection device receives an input current. The first conductive winding and the second conductive winding have a magnetic field inside the core of the current splitting mutual reactor. During a short circuit fault condition, a fault current is detected by the current protection device. For example, the current protection device detects when the fault current is greater than the normal current (e.g., a steady state current) flowing in the first and second conductive windings. More specifically, the current protection device may detect when the second conductive winding exceed a predefined threshold/trigger current, causing the actuator coupled with the electrical interrupter to actuate the moveable contact of a set of breaker contacts of the electrical interrupter. FIG. 1 shows a fault current limiter (FCL) or fault current limiter circuit 100, implemented in a power transmission and distribution system 1000. One will appreciate the power transmission and distribution system 1000 shown in FIG. 1 is non-limiting, and is provided to demonstrate one possible implementation of the FCL circuit 100. In general, the FCL circuit 100 may be configured to protect a variety of circuits and/or loads from short circuit fault currents in various power systems such as, for example, transmission, distribution and generation networks.

A power source 101 may supply power through interface circuit 103 having a complex impedance $Z_s$ including a real component $R_s$ and imaginary component $X_s$, and circuit breaker 105. Power transmission line 106 may lead to an interface 107 with a substation having a transformer 109 configured to step the transmission line voltage to a voltage compatible with electrical loads 121/123. Output of transformer 109 may be coupled to breaker 111, such as a circuit breaker, as well as to the conductor 203 and/or 205, and the FCL circuit 100. FCL circuit 100 may be coupled through breaker 115, such as a circuit breaker, and matching circuits 117, 119 to electrical loads 121/123. Additional loads and matching circuits may be provided in other embodiments. A short circuit fault 125 may exist and, if present, will be isolated by operation of various embodiments described herein.

The FCL circuit 100 can be electrically connected in series to a power source 101 and one or more electrical loads 121, 123 via conductors 203 and 205. In one embodiment, a current sensor 150 may be coupled to and/or in association with a controller 175, the controller 175 having a memory and at least one processor device. Either the controller 175 and/or the current sensor 150 may be coupled to the FCL circuit 100. One of ordinary skill in the art will appreciate the FCL circuit 100 may be implemented in a variety of other applications and power system configurations. The particular power system depicted in FIG. 1 is therefore shown by way of example and is not intended to be limiting.

In some embodiments, the FCL circuit 100 may be implemented in applications where fault protection for the $1^{st}$ peak of the fault is not strongly needed. For example, the FCL circuit 100 may be configured to limit the fault current quickly (e.g., within a half a cycle) of the occurrence of the fault condition. In some examples, the FCL circuit 100 may be configured to sense and limit fault currents within less than a cycle (e.g., <17 ms for 60 Hz system, <20 ms for 50 HZ system, or the like). As will be appreciated, a circuit breaker in some embodiments may take more than 3 cycles to sense and limit a fault. As such, systems capable of tolerating the $1^{st}$ peak fault current may be particularly suited to protection using the FCL circuit 100.

Figure 2:
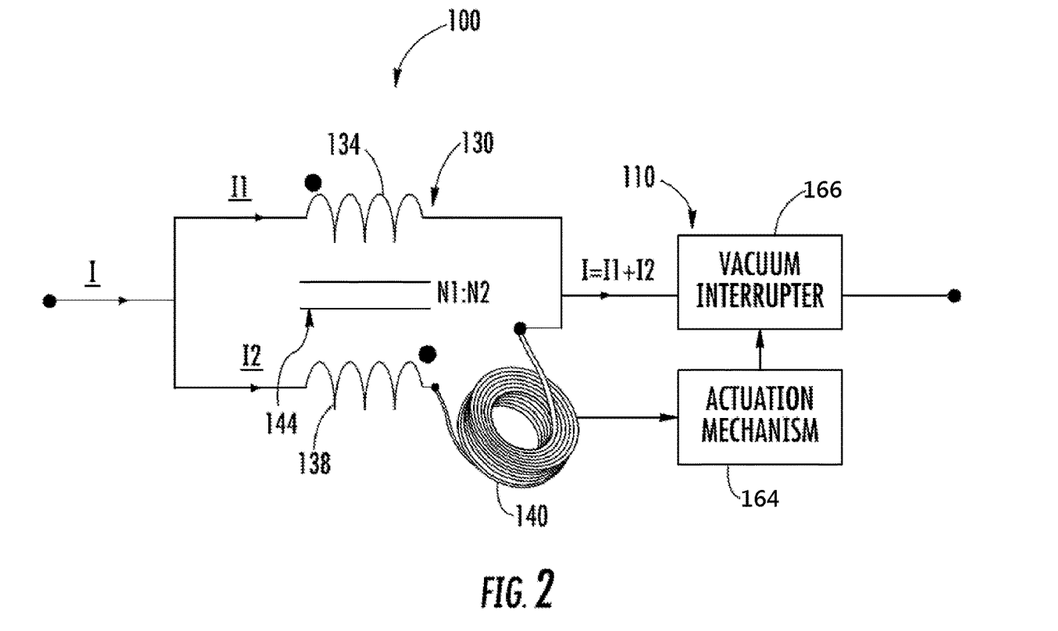
FIG. 2 depicts the structure of a current protection device, a VCR, and a current splitting reactor (CSR) in accordance with embodiments of the disclosure.

Turning now to FIG. 2, the FCL circuit 100 according to embodiments of the present disclosure will be described in greater detail. As shown, the FCL circuit 100 may include a current protection device 110, including an interrupter 166 and an actuator 164, as will be described in greater detail with reference to FIG. 3. The FCL circuit 100 may further include a mutual reactor 130, such as a current splitting reactor. The mutual reactor 130 may be configured to reduce steady state current handling needs so a less complex and/or lower cost and/or lower current protection device 110 can be used. In some examples, the FCL circuit 100 depicted in FIG. 2 may be used for circuits carrying 1 kAmps or greater (e.g., power transmission and/or power distribution). The mutual reactor 130 may include a first conductive winding 134 (e.g., a primary winding) and a second conductive winding 138 (e.g., a secondary winding). The second conductive winding 138 may be counter-wound with respect to the first conductive winding 134. The mutual reactor 130 may include the first conductive winding 134 and the second conductive windings 138 configured to exhibit minimal impedance during a steady state operation. Furthermore, in an exemplary embodiment, the first conductive winding 134 and the second conductive winding 138 are interleaved so the magnetic flux created therebetween is cancelled or greatly minimized during normal operation. The interleaving increases the mutual coupling between the first and second conductive windings 134 and 138, reducing the leakage inductance (i.e., reduces the voltage drop during normal operation with nominal current), and causing minimal effect to the performance of a power system.

The mutual reactor 130 may be used to manage high system currents so a smaller proportion of the normal/steady state and fault currents flow through the FCL circuit 100. In this embodiment, incoming system current I is split between a first component $I_1$ flowing through the first conductive winding 134, and a second component $I_2$ flowing through the second conductive winding 138. $I_2$ may be delivered to a coil 140 electrically coupled at an output of the second conductive winding 138. In some embodiments, the coil 140 is a Litz wire.

In the embodiment shown, the first conductive winding 134 may be electrically connected in parallel relationship where the $I_1$ and $I_2$ flow in the same direction. In alternative embodiments, the first conductive winding 134 may be electrically connected in a reverse-parallel relationship with the second conductive winding 138. For example, current entering the mutual reactor 130 may be directed through the first conductive winding 134 in a first direction and through the second conductive winding 138 in a second, opposite direction. In one embodiment, the current flowing through the first conductive winding 134 may therefore be equal to the current flowing through the second conductive winding 138. Because the first conductive winding 134 and the second conductive winding 138 are arranged in the reverse-parallel configuration, the conductive windings 134, 138 will be magnetically-coupled and will exhibit a negligible net and/or equivalent impedance in some embodiments. The first conductive winding 134 and the second conductive winding 138 may be wound around a magnetic core 144, such as, for example, in a bifilar coil arrangement. Other winding arrangements are available for use and may be applied depending on preference and/or technological parameters. One of ordinary skill in the art will contemplate the core may be an iron core or an air core having dimensions dictated by the current limiting parameters of a particular application.

By using the first conductive winding 134 and the second conductive winding 138 having an appropriate numbers of turns, the steady state operation of the FCL circuit 100 may be tailored to distribute steady state current along parallel paths $I_1$ and $I_2$. In the embodiment shown, the first conductive winding 134 and the second conductive windings 138 may be selected with appropriate numbers of turns (e.g., N1:N2) for evenly distributing the current in the FCL circuit 100 between the paths $I_1$ and $I_2$ so the current may be distributed so 50% flows along path $I_2$ and 50% flows along path $I_1$. The mutual reactor 130 may reduce the current flowing through the coil 140 as follows:

$$I_1 = \frac{N_1}{N_1 + N_2} I$$

$$I_2 = \frac{N_1}{N_1 + N_2} I$$

wherein, $N_1$ and $N_2$ are the number of turns, respectively in first conductive winding 134 and the second conductive winding 138. As a result, the current flowing through the coil 140 can be controlled to control the thermal behavior of the coil 140, as well as to standardize the coil 140 design to prevent changing the coil 140 for different power system applications.

In other embodiments, the steady state current is distributed so if x % of the steady state current flows along path $I_1$ the remainder (100−x) % of the steady state current flows along path $I_2$. Alternatively, if x % of the steady state current flows along path $I_2$ then the remainder (100−x) % of the steady state current flows along path $I_1$. Thus, during a steady state operation (e.g., steady state condition), the first conductive winding 134 and the second conductive winding 138 of the mutual reactor 130 may be set to distribute the steady state current along parallel paths $I_1$ and $I_2$ in a predefined manner.

In yet other embodiments, the ratio may be set to 40% flowing along path $I_2$ and 60% flowing along path $I_1$; 30% flowing along path $I_2$ and 70% flowing along path $I_1$. In other words, the ratio may be set to 40/60, 30/70, 20/80, for example, along respective paths $I_1$ and $I_2$. In some cases, where current distribution is to be set more precisely, an external tuning winding (not shown) can implemented as an optional device.

During the steady state operations of the FCL circuit 100, the first conductive winding 134 and the second conductive windings 138 cancels the magnetic field inside the core of the mutual reactor 130. More specifically, the current splitting mutual reactor 130 splits the steady state current (e.g., system current I) into two branches ($I_1$ and $I_2$) flowing through the first conductive winding 134 and the second conductive windings 138 in opposite directions to produce a net zero or negligible magnetic field resulting in a negligible equivalent or net impedance in the circuit. The reactance of the first conductive winding 134 is therefore mostly negated by the oppositely-directed reactance of the second conductive winding 138. Thus, by selecting first conductive winding 134 and the second conductive windings 138 having appropriate numbers of turns, a predetermined portion of steady state current can be routed through the mutual reactor 130. The steady state current load on the FCL circuit 100 is reduced relative to conventional FCL systems. The cost and physical size of the FCL system can therefore also be reduced.

During steady state operation of the FCL circuit 100, the mutual reactor 130 splits current into two branches flowing through the first conductive winding 134 and the second conductive winding 138 in opposite directions to produce a net zero or negligible magnetic field resulting in negligible equivalent or net impedance in the circuit. The reactance of the first conductive winding 134 is therefore mostly negated by the oppositely directed reactance of the second conductive winding 138. Thus, by selecting first conductive winding 134 and the second conductive windings 138 having appropriate numbers of turns, a predetermined portion of steady state current can be routed through the current protection device 110 at an output of the mutual reactor 130. The steady state current load on the FCL circuit 100 is reduced relative to the total system load current. The cost and physical size of the FCL circuit 100 can therefore also be reduced.

Figure 3:
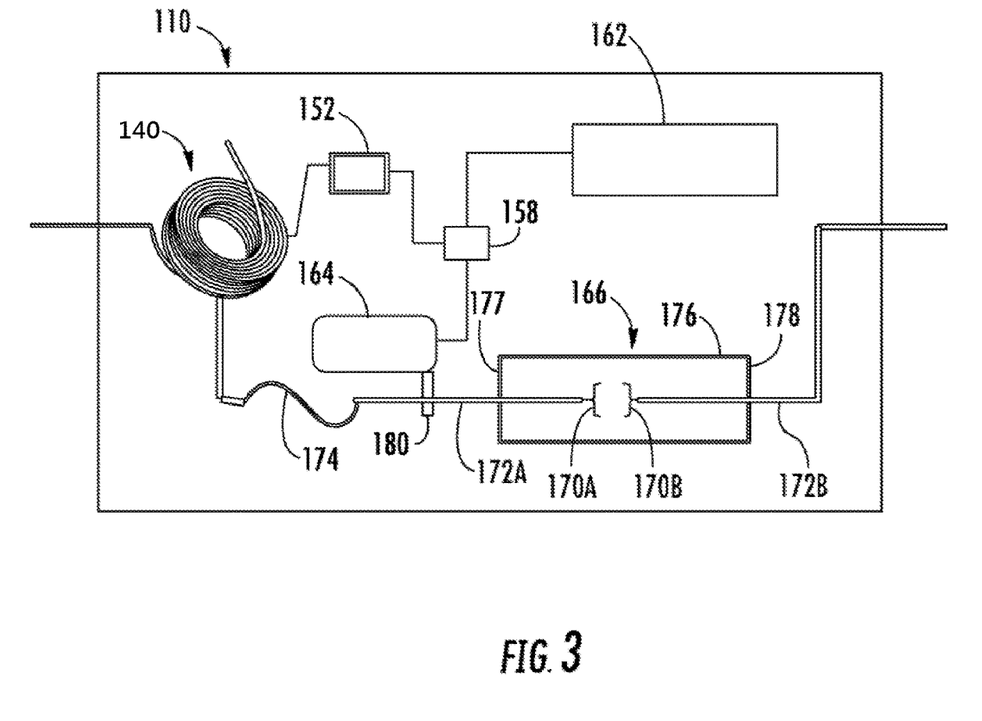
FIG. 3 depicts a CPD in accordance with embodiments of the disclosure.

Turning now to FIG. 3, the current protection device 110 according to exemplary embodiments of the disclosure will be described in greater detail. In general, the current protection device 110 may be a switch mechanism including a set of breaker contacts, at least one of breaker contact of the set of breaker contacts being actuable by a spring set by a pneumatic cylinder to open the switch and limit the current. Once the current protection device 110 opens, the current may then be transferred to a parallel connected shunt device (e.g., voltage control reactor, or the like) and the fault current is not received by the electrical loads 121/123 (FIG. 1).

As shown, the current protection device 110 may include a detection device or circuit 152 electrically coupled to a pneumatic timer 158. In some embodiments, the pneumatic timer 158 may include memory and at least one processing device. The pneumatic timer 158 is further electrically/communicably coupled with an air supply 162 and the actuator 164 (e.g., a pneumatic cylinder), wherein the processing device of the pneumatic timer 158 may control operation of the air supply 162 and/or the actuator 164 according to an input signal transmitted from the current transformer 154.

The current protection device 110 may further include the interrupter 166 (hereinafter referred to as an electrical vacuum interrupter (EVI)) having a set of breaker contacts 170A-B extending from corresponding first and second terminals 172A-B. As shown, the set of breaker contacts 170A-B and at least a portion of the first and second terminals 172A-B may be positioned within a housing 176 of the EVI 166. As shown, at least one contact (e.g., breaker contact 170A) of the set of breaker contacts 170A-B may be moveable with respect to the other breaker (e.g., breaker contact 170B) and the housing 176.

During use, the detection circuit 152, e.g., a current/voltage detector, may read a signal from the current transformer 154 and determine if the current is above a specified threshold. In the event the threshold is exceeded, the detection circuit 152 may send a signal to the pneumatic timer 158 to activate the actuator 164, thus breaking the continuity of the circuit by separating the set of breaker contacts 170A-B. In some embodiments, the pneumatic timer 158 may then hold the set of breaker contacts 170A-B open for a predetermined time, for example, to allow a superconducting tape (not shown) to return to a superconducting state minus the burden of steady current flowing through the superconducting tape. After the predetermined time, the pneumatic timer 158 may allow air pressure to be released from the actuator 164, causing the set of breaker contacts 170A-B to close and current to flow through the current protection device 110, for example, through a flexible bus bar 174 coupled between the coil 140 and the first terminal 172A.

In some non-limiting embodiments, the EVI 166 may be an insulating enclosure or housing 176 including respective end plates 177 and 178. The set of breaker contacts 170A-B are disposed centrally of a vacuum chamber formed by the housing 176. As shown, each of the set of breaker contacts 170A-B is mounted at an end of each respective first and second terminal 172A-B. In some embodiments, the first terminal 172A may be actuable through an opening in the end plate 177. In other embodiments, the second terminal 172B may be also be actuable through an opening in the end plate 178.

As further shown, the first terminal 172A may be mechanically/physically coupled to a lever arm 180 of the actuator 164, such as a pneumatic cylinder, for opening or closing the set of breaker contacts 170A-B of the EVI 166. For example, during use, the lever arm 180 is fixedly secured to the first terminal 172A so activation of the actuator 164 causes movement of the lever arm 180 and therefore the first terminal 172A relative to the second terminal 172B. Movement of the first terminal 172A and the lever arm 180 may break the continuity of the circuit by separating the set of breaker contacts 170A-B. In some embodiments, the pneumatic timer 158 causes the lever arm 180 to move laterally away from the EVI 166 and towards the current transformer 154, holding the set of breaker contacts 170A-B open for a predetermined time. Conversely, the pneumatic timer 158 may also cause the lever arm 180 to move laterally towards the EVI 166 when air pressure is released from the actuator 164, thus causing the set of breaker contacts 170A-B to close.

Figure 4:
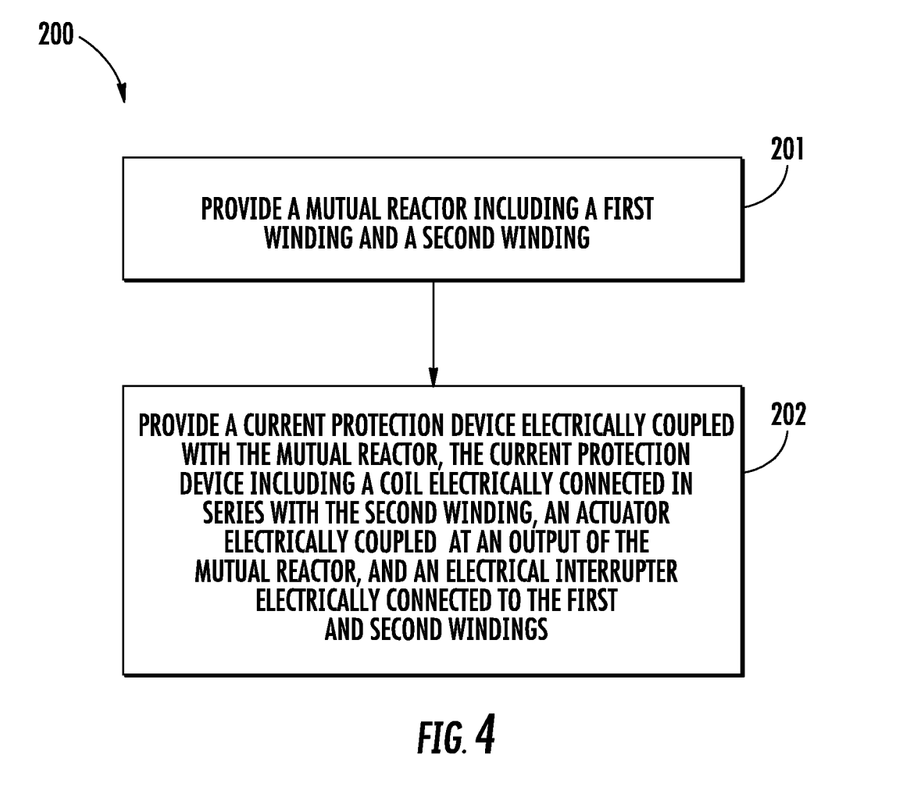
FIG. 4 depicts a method for providing fault current protection in accordance with embodiments of the disclosure.

Turning now to FIG. 4, a method 200 for limiting a fault current according to embodiments of the present disclosure will be described in greater detail. Specifically, at block 201, the method 200 may include providing a mutual reactor including a first winding and a second winding. In some embodiments, the first winding is a primary winding and the second winding is a secondary winding, wherein the first and second windings are arranged in parallel to one another At block 202, the method may include providing a current protection device electrically coupled with the mutual reactor, the current protection device comprising a coil electrically connected in series with the second winding, an actuator electrically coupled at an output of the mutual reactor, and an electrical interrupter electrically connected to the first and second windings. In some embodiments, the actuator is communicatively coupled with the electrical interrupter to actuate a moveable contact of a set of breaker contacts of the electrical interrupter. In some embodiments, the method 200 may include providing a control signal to the pneumatic cylinder to actuate the moveable contact of the set of breaker contacts. In some embodiments, the method 200 may further include opening the set of breaker contacts based on a detected current being greater than a predetermined threshold. In some embodiments, the current protection device may include a detection circuit in the form of a current (I)-voltage (V) circuit configured to receive a signal or indication of a current from a current transformer. In some embodiments, the current transformer and a pneumatic timer are connected in series. In some embodiments, an air supply (e.g., an air tank) may be coupled with the pneumatic timer and a pneumatic cylinder.

In sum, various embodiments described herein provide a mutual reactor current protection device for use as part of a fault current limiter system. A first advantageous effect of the embodiments of the disclosure includes the ease of integration into most power transmission and distribution systems by eliminating the use of large solenoid coils and mechanical timing mechanisms. A second advantageous effect of the embodiments of the disclosure includes increased control and reliability because, unlike prior art approaches, there is no low limit to the current capable of actuating the pneumatic cylinder and lever arm. Instead, the EVI of the present disclosure is capable of generating a full stroke independent of the fault current threshold. A third advantageous effect of the embodiments of the disclosure includes the ability to quickly close the set of breaker contacts within the EVI, thus minimizing the welding effect potentially occurring inside the EVI housing. A fourth advantageous effect of the embodiments of the disclosure is the ability to control the current flowing through the coil to thus control the thermal behavior of the coil, as well as to standardize the coil design to prevent changing the coil for different power system applications.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A fault current limiter comprising:
a mutual reactor including a first winding and a second winding; and
a current protection device electrically coupled with the mutual reactor, the current protection device comprising:
a coil electrically connected in series with the first winding or the second winding;
an actuator receiving an output of the mutual reactor, wherein the coil is electrically connected with a pneumatic timer via a detection circuit; and
an electrical interrupter electrically connected to the mutual reactor, wherein the actuator is communicatively coupled with the electrical interrupter to actuate a moveable contact of a set of breaker contacts of the electrical interrupter.

2. The fault current limiter of claim 1, wherein the first and second windings are electrically arranged in parallel.

3. The fault current limiter of claim 1, wherein the electrical interrupter is an electrical vacuum interrupter.

4. The fault current limiter of claim 1, wherein the actuator comprises an air supply and a pneumatic cylinder, and wherein the air supply and the pneumatic cylinder are coupled with the pneumatic timer.

5. The fault current limiter of claim 4, wherein the pneumatic cylinder includes a lever arm mechanically coupled to the moveable contact for opening or closing the set of breaker contacts.

6. The fault current limiter of claim 1, wherein the coil comprises a Litz wire.

7. The fault current limiter of claim 1, wherein the coil is electrically coupled at an output of the second winding.

8. A current protection device comprising:
a coil electrically connected in series with a first winding or a second winding of a mutual reactor;
an actuator receiving an output of the mutual reactor, wherein the coil is electrically connected with a pneumatic timer of the actuator via a detection circuit; and
an electrical interrupter connected to the mutual reactor, wherein the actuator is communicatively coupled with the electrical interrupter to actuate a moveable contact of a set of breaker contacts of the electrical interrupter.

9. The current protection device of claim 8, wherein the electrical interrupter is an electrical vacuum interrupter.

10. The current protection device of claim 8, wherein the actuator comprises an air supply and a pneumatic cylinder, and wherein the air supply and the pneumatic cylinder are coupled with the pneumatic timer.

11. The current protection device of claim 10, wherein the pneumatic cylinder has a lever arm mechanically coupled to the moveable contact for opening or closing the set of breaker contacts.

12. The current protection device of claim 8, wherein the coil comprises a Litz wire.

13. The current protection device of claim 8, wherein the coil is directly electrically coupled in series with the second winding.

14. A method for limiting a fault current, the method comprising:
providing a mutual reactor including a first winding and a second winding; and
providing a current protection device electrically coupled with the mutual reactor, the current protection device comprising:
a coil electrically connected in series with the second winding;
an actuator receiving an output of the mutual reactor, wherein the coil is electrically connected with a pneumatic timer of the actuator via a detection circuit; and
an electrical interrupter electrically connected to the mutual reactor, wherein the actuator is communicatively coupled with the electrical interrupter to actuate a moveable contact of a set of breaker contacts of the electrical interrupter.

15. The method of claim 14, further comprising providing a pneumatic cylinder to actuate the moveable contact of the set of breaker contacts.

16. The method of claim 15, further comprising providing a control signal to the pneumatic cylinder to actuate the moveable contact of the set of breaker contacts.

17. The method of claim 14, further comprising opening the set of breaker contacts based on a detected current being greater than a predetermined threshold.

18. The method of claim 14, wherein the electrical interrupter is an electrical vacuum interrupter.

19. The method of claim 14, wherein the first winding and the second winding are electrically arranged in parallel.

20. The method of claim 15, further comprising coupling an air supply with the pneumatic timer and the pneumatic cylinder.

* * * * *